United States Patent [19]

McClain

[11] 4,120,919
[45] Oct. 17, 1978

[54] QUICK OPENING REMOVABLE TRAY SECTIONS FOR FLUID CONTACT

[75] Inventor: Robert W. McClain, Dallas, Tex.

[73] Assignee: Glitsch, Inc., Dallas, Tex.

[21] Appl. No.: 799,711

[22] Filed: May 23, 1977

Related U.S. Application Data

[63] Continuation-in-part of Ser. No. 745,383, Nov. 11, 1976, abandoned.

[51] Int. Cl.$^2$ ............................................. B01D 3/32
[52] U.S. Cl. .............................. 261/114 TC; 52/19; 52/578; 202/158; 202/270; 203/DIG. 22; 404/25
[58] Field of Search ......... 261/114 R, 114 A, 114 JP, 261/114 VT, 114 TC, 109, 110, 113, 44 R; 202/158, 170; 52/19-21, 578, 581, 582; 404/25, 26; 402/26, 27, 36, 39; 203/DIG. 22

[56] References Cited

U.S. PATENT DOCUMENTS

| | | | |
|---|---|---|---|
| Re. 22,946 | 12/1947 | Glitsch | 261/114 R |
| 1,033,448 | 7/1912 | Mueller | 404/26 X |
| 2,059,044 | 10/1936 | Seelig et al. | 261/114 R |
| 2,210,808 | 8/1940 | Glitsch | 261/114 R |
| 2,375,409 | 5/1945 | Glitsch | 261/114 R |
| 2,582,657 | 1/1952 | Serner | 261/114 TX |
| 2,611,457 | 9/1952 | Glitsch | 261/114 R X |
| 2,611,596 | 9/1952 | Glitsch | 261/114 R |
| 2,681,820 | 6/1954 | Rapisarda et al. | 261/114 TC |
| 2,875,867 | 3/1959 | Hart | 261/114 R X |
| 2,931,469 | 4/1960 | Iglehart et al. | 261/113 X |
| 3,205,896 | 9/1965 | Weichert | 402/39 X |
| 3,254,576 | 6/1966 | Metelka | 52/581 X |
| 3,759,497 | 9/1973 | Black | 261/113 |
| 3,807,711 | 4/1974 | Hirao et al. | 261/114 VT X |

*Primary Examiner*—Richard L. Chiesa
*Attorney, Agent, or Firm*—Joseph H. Schley; Thomas L. Cantrell

[57] ABSTRACT

Novel quick opening removable tray sections or deck plates for trays of fluid contact vessels having foldable closures or covers adapted to rest upon frame members which coact to form perimeters of one or more polygonal, preferably quadrangular, complementary openings in each tray. Each cover has at least a pair of closure panels hingedly connected at their adjacent inner margins. Opposed outer lateral or side margins of closure panels, which overlie complementary lateral or side frame members in spaced relationship, extend in the same general direction as their adjacent inner margins. At least one of opposed outer lateral margins is slidably confined whereby cover is removable upon elevating closure panels at their hinged inner margins and simultaneously sliding said outer lateral panel margins toward each other and out of confinement so as to permit folding of said cover. If desired, one of opposed outer lateral margins of closure panels may be hingedly connected to adjacent edge portion of tray instead of being slidably confined. Frictional fasteners detachably secure end margins of closure panels adjacent their hinged connection to underlying portions of end frame members at opposed ends of tray opening. Any of the deck plates of a tray may be removably mounted in this manner.

34 Claims, 22 Drawing Figures

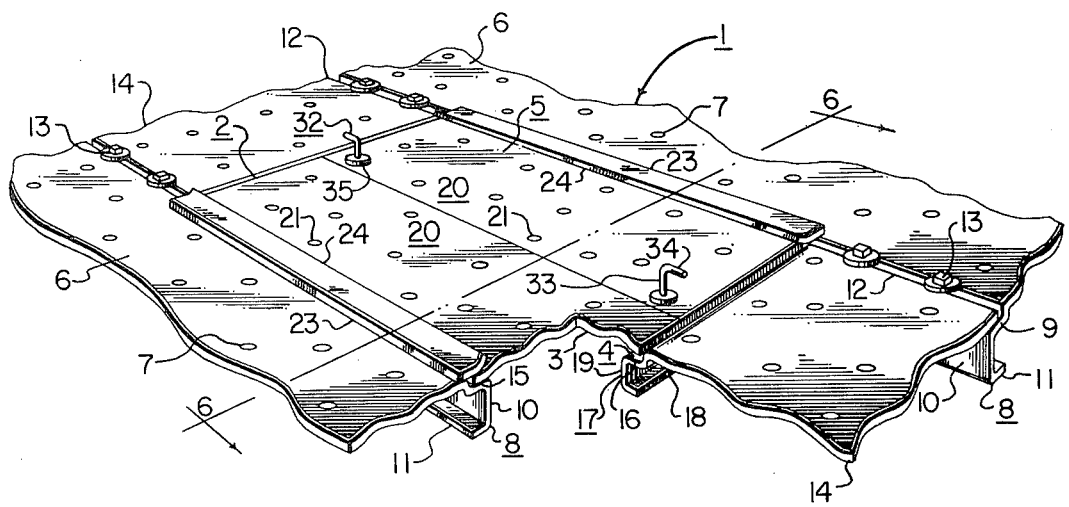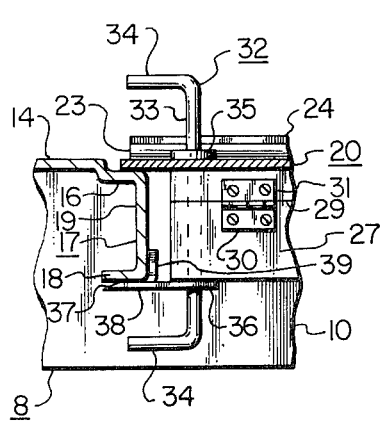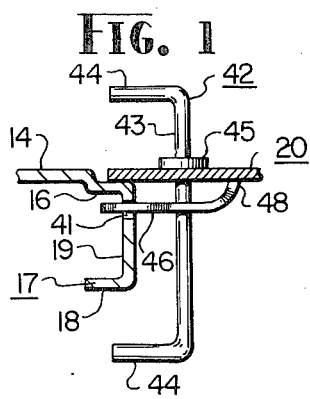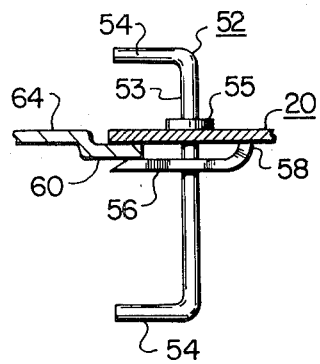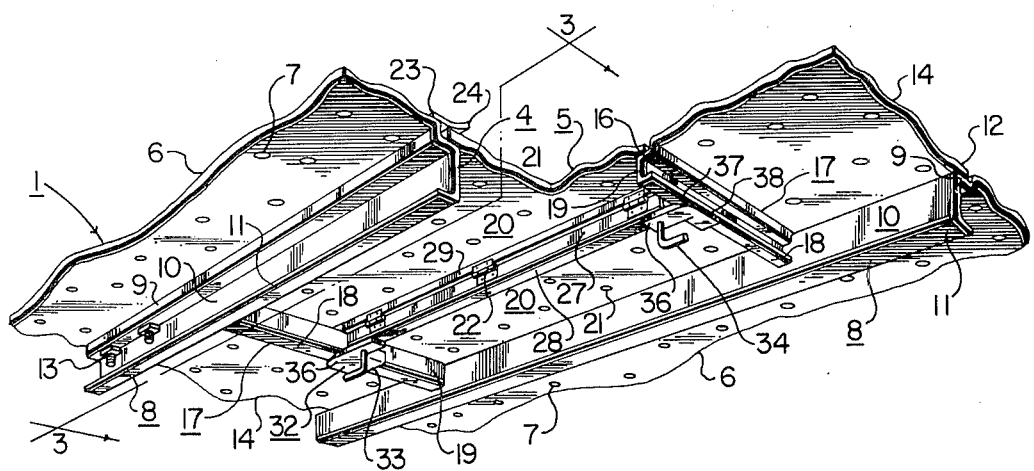

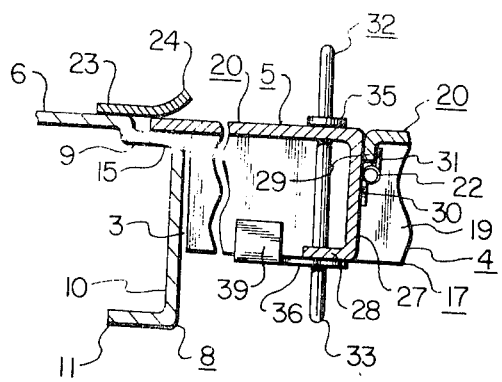
FIG. 6
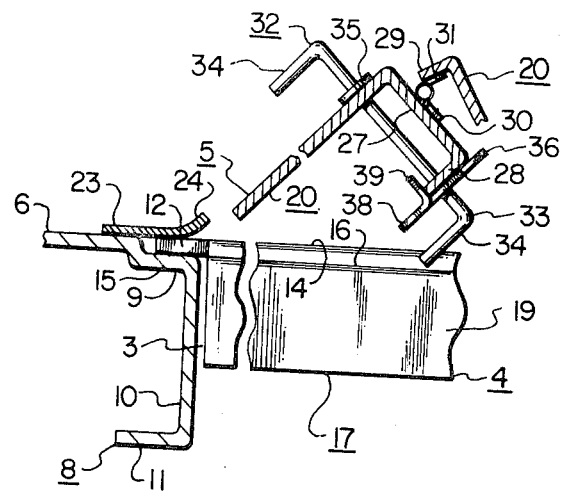
FIG. 7
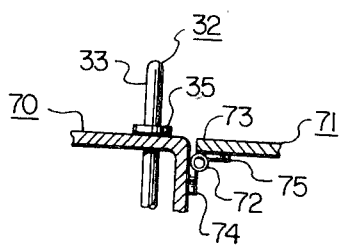
FIG. 8
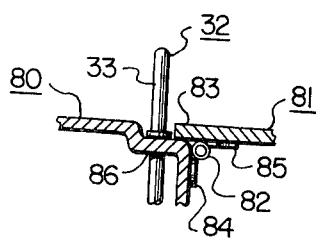
FIG. 9
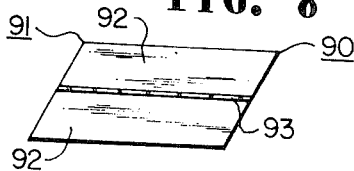
FIG. 11
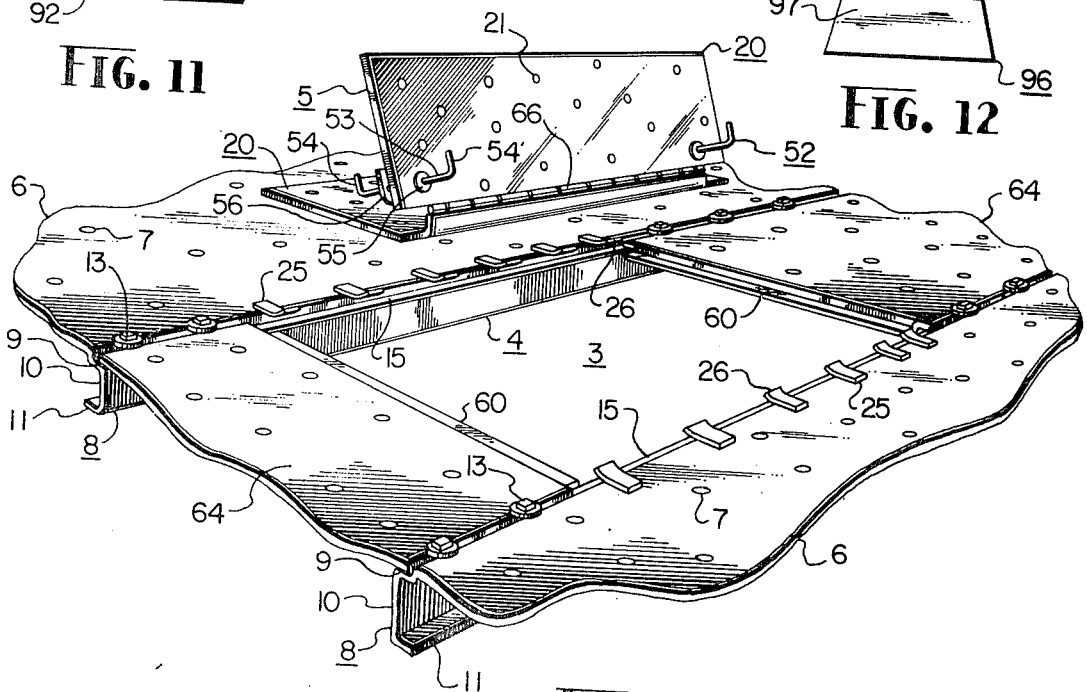
FIG. 10
FIG. 12

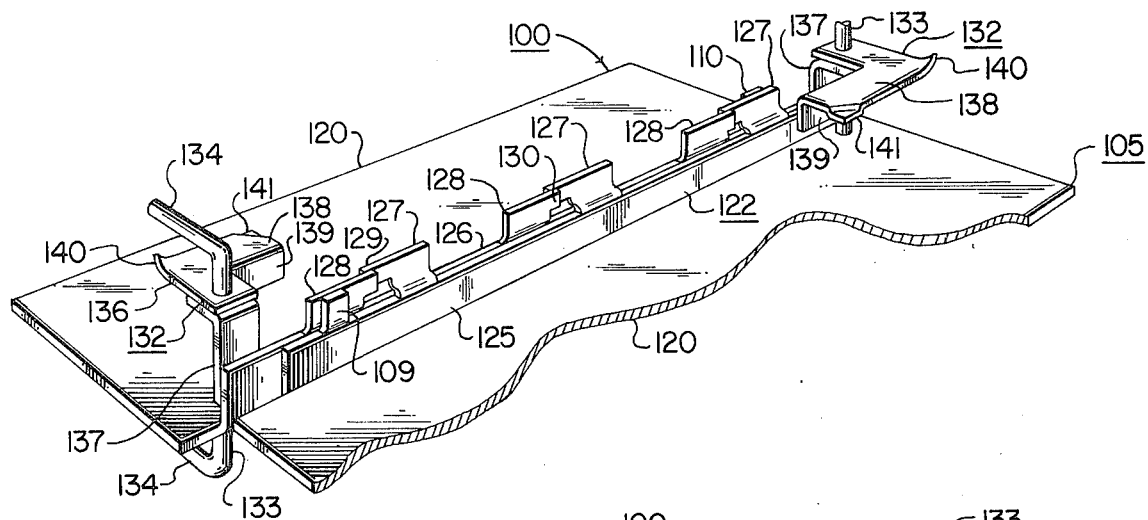
FIG. 18
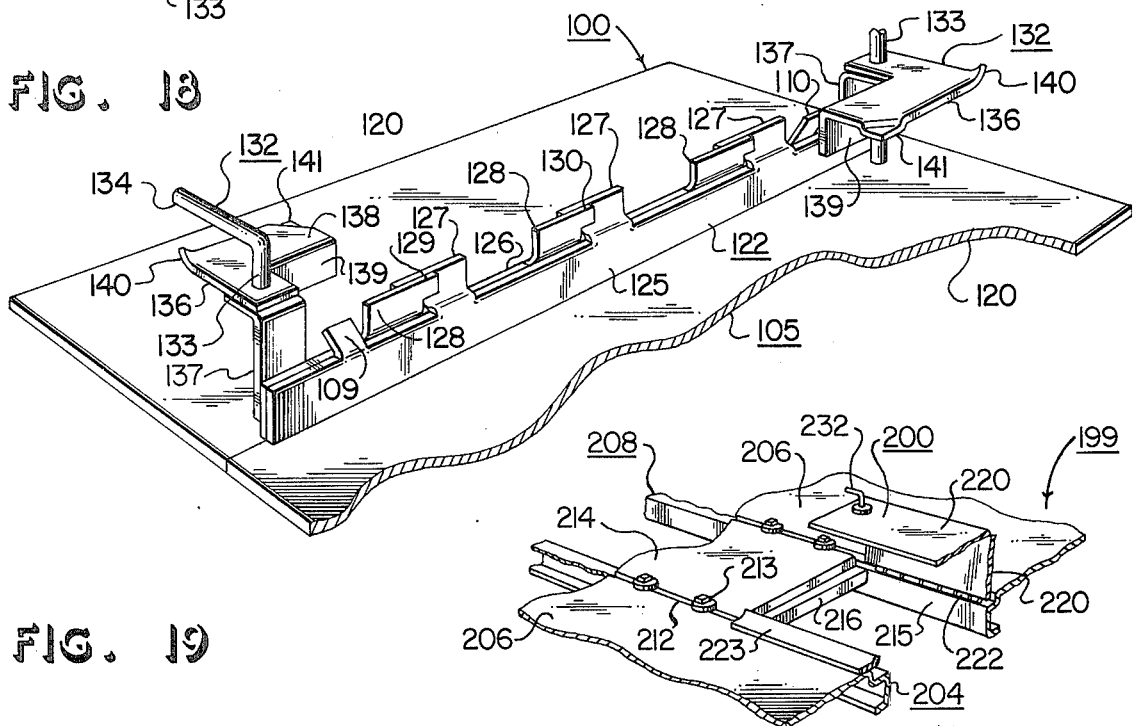
FIG. 19
FIG. 22
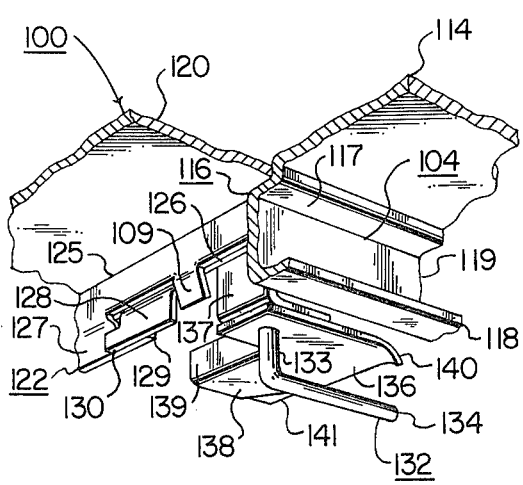
FIG. 20
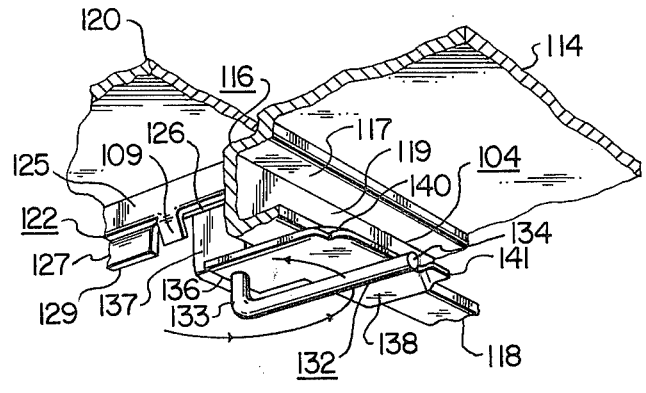
FIG. 21

QUICK OPENING REMOVABLE TRAY SECTIONS FOR FLUID CONTACT

This application is a continuation-in-part of co-pending application filed Nov. 11, 1976, Ser. No. 745,383, now abandoned.

BACKGROUND OF THE INVENTION

In fractionating towers and other fluid contact vessels, it is customary to provide manways in the trays thereof (one for each flow path of each tray) so as to permit the passage of workmen, tools, tray plates and supports therefor as well as other equipment from one tray to another. Each manway comprises an opening, usually quadrangular, in each tray and an overlying complementary cover or closure of slightly greater dimensions than the opening so as to overlap the marginal edge portions of said tray contiguous said opening and rest on the manway frame forming the margins of the latter. Preferably, suitable fasteners, such as frictional clamps, detachably connect the cover or closure of each manway to its tray in overlying relation to the opening of the manway and are operable from above and below the tray whereby one workman may open and close said manway from thereabove and/or therebelow without assistance. Heretofore, the dimensions of a manway have been limited to a degree by the distance between adjacent trays due to the necessity of the closure or cover being slightly larger than the opening of said manway and still permit passage of said closure through said opening.

Since it is not economical to provide a manhole in the wall of a fractionating tower or other fluid contact vessel for each tray, it is frequently necessary to pass a manway cover or closure as well as other articles and tray parts through its opening as well as the manway openings of other trays. Also, the size of the vessel manhole limits the width or lesser dimension of the manway closure as well as of the tray plates and supports therefor. In addition, the installation and removal of a conventional manway closure is time consuming since it is necessary to frictionally clamp or otherwise detachably fasten all of the margins of the closure to the underlying marginal edge portions of the tray. Another factor that must be taken into consideration is that each manway cover or closure must conform to the structure of its tray so that it does not materially affect the overall characteristics and/or performance of the tray. Difficulty is also encountered when the diameter of the tower or vessel is relatively small as well as when the space between adjacent trays is obstructed, such as by downcomers. Frequently, a manway may be of less transverse dimension in one direction, such as width, than in the other direction or length since an oblong or elongate manway accommodates the passage of a workman, tools, tray parts and most other equipment which generally have an oblong configuration.

The space between adjacent fluid contact trays may be between 12 and 48 inches, but ordinarily is from 12 to 24 inches. Although the external diameter or maximum transverse dimension of the manholes in the wall of a fluid contact vessel may vary from 16 to 24 inches, usually, said external diameter is between 16 to 18 inches. Accordingly, conventional tray manways have a maximum width or lesser dimension of from 11 to 15 inches. It is noted that the perimetrical shape of the manway is not critical, since it may be of any suitable polygonal configuration, such as triangular, quadrangular, hexagonal, trapezoidal, parallelogram, etc. Normally, rectangular configuration best lends itself to the angular relationship of the margins of tray plates and supports therefor. For economy of manufacture as well as installation and removal, trays of the same or similar type in a fluid contact vessel are as uniform as possible and have generally identical manways in the same relative position. Additionally, the shape, size and location of the manway of a tray may be controlled by the structure of adjacent trays and/or their manways.

SUMMARY OF THE INVENTION

This invention relates to novel quick opening sections, including manways, for the trays of fractionating towers and other fluid contact vessels and comprise foldable closures or covers complementary to and overlying openings formed in said trays. Although the removable tray sections are usually rectangular, it is readily apparent that said tray sections may be of substantially triangular, quadrangular or other polygonal shape in that all of its corners need not be right angular and opposed margins thereof need not be parallel nor of identical length. Perimetrical end or transverse and lateral or side frame members define the openings of the trays and may be formed separately of or integral with the deck or floor plates of said trays and/or beams or other tray supports, such as by downwardly offset flanges on the margins of said plates.

Generally, it is desirable for the closures or covers and the adjacent deck or floor plates to have coplanar top sides or upper surfaces whereby the frame members are preferably recessed or offset downwardly of said plates so as to permit flush mounting of said closure or covers. Preferably, the latter are composed of at least pairs of oblong panels or portions which may be of approximately equal size or one-half the areas of the manway or tray openings and hinged to one another for folding to the aforesaid one-half areas or sizes. Accordingly, the maximum width or lesser dimension of the removable tray sections may be increased to from between 15 inches to 24 inches and still be passable through the 16 inch manholes of a fluid contact vessel or tower. If desired, this folding feature may be applied to the greater dimension or length of the tray sections as well as to its lesser dimension or width and to tray sections having generally equal transverse dimensions or are square or are triangular or of other polygonal shape.

As stated, elongate or oblong tray openings are most desirable and are preferred due to the small diameter or maximum size of the manholes of fluid contact vessels as well as to the general oblong transverse contour and elongate length of the human body and of most articles which must pass through said openings. Furthermore, oblong tray openings provide greater areas when it is necessary to restrict one of the dimensions thereof. The hinged connection of the closure panels of the removable tray sections may be coextensive therewith or consist of a plurality of spaced hinges and, in most installations, is disposed between contiguous inner longitudinal margins of said panels. Suitable fasteners detachably connect the ends of the closure panels to the underlying portions of the end or transverse frame members and, preferably, are carried by said panels.

At least one, preferably both, of the opposed of each removable tray tray section outer lateral or side margins of the closure panels are confined in overlying relation to the complementary portions of the lateral or side frame members by suitable keepers or clips secured to and projecting laterally from the margins or edge portions of deck plates adjacent said complementary lateral frame members in spaced relation thereto. Although it is desirable that these confining keepers or clips be generally coextensive with the lateral or side margins of the tray openings and that each be in the form of an elongate narrow plate or strip so as to provide an overlying seal therefor, it is readily apparent that said confining keepers or clips may be composed of a multiplicity of spaced relatively small plates or clamp washers welded or otherwise secured to and projecting laterally from the aforesaid margins or edge portions of adjacent tray plates when it is necessary to seal off said lateral margins of said tray openings or packing means is provided therefor.

Due to the confinement of the outer lateral margins of the closure panels and the hinged connection thereof, fastening of said panels one each at opposite end margins or both end margins of only one or either of said panels is sufficient to secure each tray section against displacement. Preferably, the end fasteners are positioned in relatively close proximity to the inner margins of the panels so as to provide maximum efficiency. Upon disconnection of the end fasteners, the closure panels are adapted to be elevated or pivoted upwardly about the longitudinal axis of the hinged connection at their adjacent inner margins so as to swing said panels transversely inward and withdraw their outer lateral margins from beneath the confining keepers with the ends of said lateral margins sliding inwardly upon the end frame members whereby each of the folded tray sections may be lifted and removed or placed to one side. Upon installation or replacement, each of the folded tray sections is positioned with the ends of the outer lateral margins of its closure panels resting upon the end frame members and its end fasteners opened. Downward pivoting of the closure panels about the axis of the hinged connection at their inner margins slides said panels outwardly so as to again engage their outer lateral margins beneath the confining keepers, whereby each removable tray section may be latched in place by actuation of the end fasteners.

In some installations, it is desirable to seal the joint between the adjacent inner margins of the closure panels as well as reinforce said margins and this may be accomplished by downwardly offsetting one of said inner panel margins with the other inner panel margin projecting inwardly beyond the hinged connection so as to overlap said downwardly offset panel margin when each of the tray sections is unfolded to its flat closed position. Another mode of sealing this medial joint could be provided by bending or deforming the aforesaid inner margins of the closure panels downwardly to provide depending flanges which carry the hinged connection and which abut when each of the removable tray sections is unfolded to its flat closed position. Also, only one of the inner panel margins may be flanged since this could be adequate to reinforce both of said margins due to their hinged connection. If desired, conventional packing such as strips of suitable sealing material, may be utilized to seal off between the frame members and the overlapping marginal edge portions of each of the tray sections as well as between the adjacent inner margins of its closure panels.

It is noted that the closure panels need not be of the same area or size so long as said panels coact to provide an adequate cover or closure for each tray opening.

Any one of the deck plates of a tray may be removably mounted in accordance with the invention. Also any of the removable tray sections could be constructed of three panels connected to each other by two sets of hinges. Likewise, any of the hinged connections between the closure panels may be separable so as to permit independent handling of said panels due to their size and/or weight and/or to the spacing between adjacent trays. Sometimes, it may be desirable to hingedly connect the outer lateral margin of one of the closure panels to the edge portion of the deck plate adjacent the lateral or side frame member underlying said outer lateral panel margin, whereby only one of said closure panels has its outer lateral margin slidably confined.

In a preferred embodiment of the invention, the hinge connection may be composed of generally coextensive upright flanges depending from the adjacent inner margins of a pair of closure panels and having a plurality or set of spaced coacting angular hinge elements projecting downwardly therefrom. Each set of hinge elements is offset laterally outward in parallel relation to its flange for transversely overlapping the complementary set of offset hinge elements of the other flange. The hinge elements of each set are staggered or offset relative to the hinge elements of the other set to permit intermeshing of said hinge elements when the flanges of the closure panels are in abutting relationship. An extension or finger projects longitudinally from one end of each hinge element in transversely spaced relation to its flange, with the fingers of each set of hinge elements projecting in the same direction and opposite to the direction of the fingers of the other set of hinge elements so as to overlie the opposite end portions of said other set of hinge elements. Preferably, the closure panels are identical and each set of hinge elements are closer to one end of its panel than the other so as to longitudinally stagger or offset said hinge element sets when one of said panels is reversed end-to-end. The sets of hinge elements are adapted to be joined by inward relative reciprocation of the closure panels longitudinally of their flanges. Disengagement of the hinge elements is accomplished by reverse or outward relative reciprocation of the panels longitudinally of their flanges. Preferably, each flange has bendable latch means projecting from one of its end portions for overlapping the outermost hinge element at the opposite end portion of the other flange so as to prevent the aforesaid outward relative reciprocal movement of the closure panels and separation thereof.

The speed of removal and reinstallation of the tray sections are most important due to a number of factors among which are the necessity of periodic shutdowns for inspection, repair and/or modifications, the high cost of engineers and skilled technicians, the relatively large number of trays and the loss of production time as well as the relatively few manholes—for economy and strength—provided in the wall of a modern fractionating column and other fluid contact vessels. These shutdowns occur annually or semiannually, and the trays and other interior elements of the vessels are sectionalized so as to permit passage thereof through manholes of minimum size. As a result, an inspector or other workman must pass through a number of the openings of other trays in order to reach a particular tray. It has been found that the novel tray sections disclosed herein permit removal and replacement of each of said sections within 25 to 35% of the time required by conventional manways, whereby a saving of 75 to 65% in man hours is made possible.

BRIEF DESCRIPTION OF THE DRAWINGS

FIG. 1 is a top perspective view of a portion of one of the trays of a fluid contact vessel having a manway or other removable tray section constructed in accordance with the invention and showing its foldable closure detachably connected to said tray in overlying relation to an opening therein and the perimetrical frame members of the opening, FIG. 2 is an underside perspective view of the closed opening and adjacent portions of the fluid contact tray of FIG. 1 and shows the detachable connection of the foldable closure to the frame members of said opening, FIG. 3 is a transverse vertical sectional view taken on the line 3—3 of FIG. 2 to illustrate said detachable connection of one end margin of one of the closure panels to the underlying portion of one of the frame members as well as the hinged connection between said closure panels, FIG. 4 is a fragmentary transverse vertical sectional view showing a modified detachable fastening of said end margin of said closure panel to said underlying end frame member portion, FIG. 5 is a view similar to FIG. 4 and illustrating another modification of detachably fastening said closure panel end margin to said end frame member portion, FIG. 6 is a transverse vertical sectional view, taken on the line 6—6 of FIG. 1, showing the hinged connection between the inner margins of said closure panels in closed position as well as the confinement of the outer lateral margin of one of said closure panels in engagement with the underlying portion of the lateral frame members, FIG. 7 is a view similar to FIG. 6 and shows said cover partially folded and disconnected from said frame members, FIG. 8 is a fragmentary transverse vertical sectional view illustrating a modified hinged connection between said closure panels, FIG. 9 is a view similar to FIG. 8 and shows another modification of the hinged connection between said closure panels, FIG. 10 is a perspective view of the removable area of a fluid contact tray wherein the end frame members are modified, as in FIG. 5, the cover is folded and placed to one side and spaced clips are provided for confining the outer lateral margins of the closure panels, FIG. 11 is a top plan view of a modified removable tray section, FIG. 12 is a view, similar to FIG. 11, of another embodiment, FIG. 18 is a view, somewhat similar to FIG. 17, showing initial engagement of said hinge elements, FIG. 19 is a view, similar to FIG. 18, and illustrates full mating engagement of said hinge elements and the latching thereof against disengagement, FIG. 20 is an enlarged underside perspective view showing a portion of one end of said removable tray section overlying the opening of the tray and one of its end fasteners in unlocked position, FIG. 21 is a view, similar to FIG. 20, showing said fastener in locked position, and FIG. 22 is a broken perspective view of a portion of a removable tray section embodying a modification of the invention.

DESCRIPTION OF AN EMBODIMENT

Figure 13:
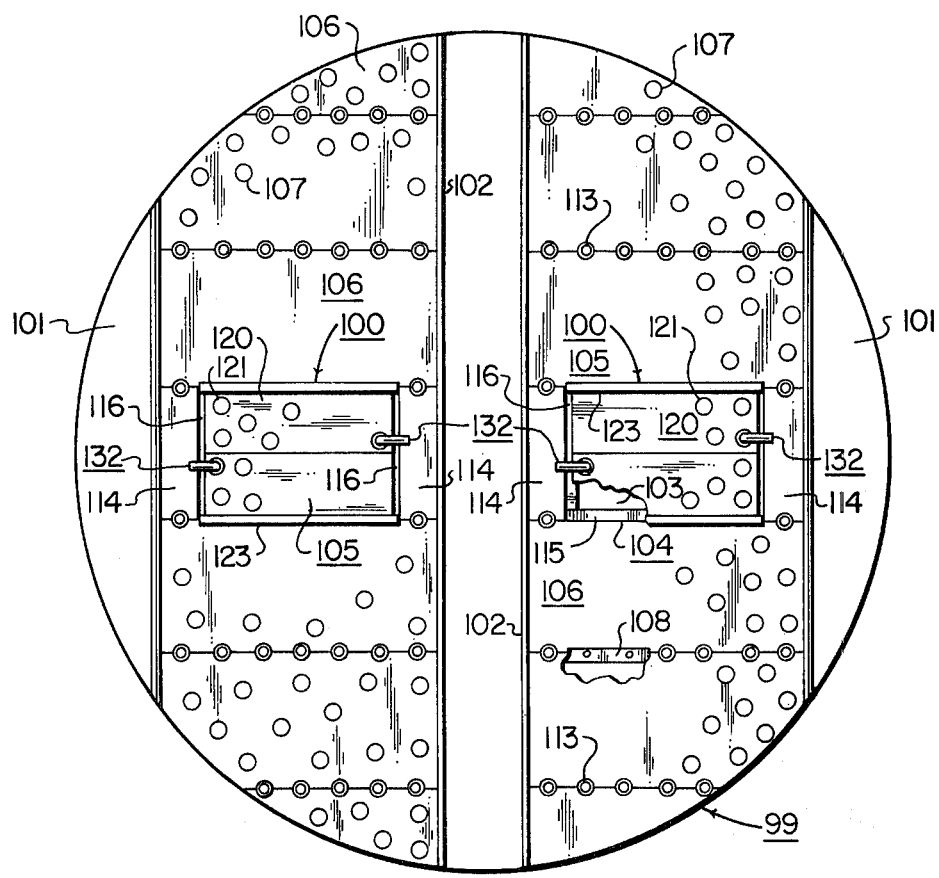
FIG. 13 is a top plan view of a tray of a fluid contact vessel having a pair of manways or other removable tray sections embodying the invention.

In the drawings, the numeral 1 designates a portion of one of the trays of a fractionating tower or fluid or vapor-liquid contact vessel (not shown) having one or more removable sections or deck plates, hereinafter referred to as removable tray section or manway 2, therein embodying the principles of the invention. Each of the removable tray sections or manways 2 is composed of a polygonal, preferably, quadrangular or rectangular, opening 3 in the tray 1, surrounded by a recessed frame 4, and an overlying closure or cover 5 complementary to the frame. The tray 1 may be of any suitable construction and type, such as bubble cap, sieve or perforated, valved, accumulator, side-to-side, and is shown as having a multiplicity of flat deck or floor plates 6 which may be perforated, as shown at 7, and which are adapted to be supported by suitable beams 8 underlying the adjacently-spaced longitudinal edge or lateral margins of the plates. As illustrated in FIGS. 1, 2, each of the beams 8 may be generally coextensive and integral with one of the lateral margins of each plate 6 and have an upper flat generally horizontal flange or shoulder 9 which may be, and preferably is, offset downwardly thereof a distance substantially equal to the thickness of the deck plates. A similar lower reinforcing flange 11 may underlie the upper flange or shoulder 9 and be connected thereto in spaced generally parallel relationship by an upright coextensive web 10 whereby said lateral plate margin is C-shaped in cross-section. The downwardly offset upper marginal flange or shoulder 9 of each deck or floor plate is adapted to be engaged by and provide an underlying support for the flat coplanar longitudinal edge portion 12 of adjacent deck plate 14 in the aforesaid adjacently-spaced relationship. As shown at 13, spaced frictional clamps or fasteners are mounted on each offset upper flange or shoulder 9 and have portions thereof in overlapping confining engagement with the flat coplanar longitudinal edge portion 12 of the aforesaid adjacent plate for detachably connecting said deck plates to one another.

It is noted that the longitudinal margins of both illustrated plates 6, abutting or contiguous the opposed lateral margins of the removable tray section or manway 2 and its cover or closure 5, are provided with integral beams 8. Both longitudinal edge portions 12 of deck or floor plates 14, disposed between adjacent plates 6 and at the ends of the manway, or removable tray section, are coplanar and flat so as to rest upon and be detachably connected to the downwardly offset upper flanges or shoulders 9 of the beams by fasteners 13. These intermediate deck plates may have spaced perforations similar to plate perforations 7. As disclosed by the expired patent to Glitsch, Re. 22,946, among others, the tray supports or beams 8 may be constructed separately of the plates 6 with adjacent longitudinal flat edge portions or lateral margins of said plates resting thereupon and removably confined in engagement therewith by frictional clamps or fasteners or any other type of detachable connection means.

As best shown in FIGS. 1, 2, 6, 7, lateral or side frame members or portions 15 of the recessed frame 4 are formed by opposed portions of the downwardly offset upper flanges or shoulders 9 of the integral beams of the tray plates which are contiguous the lateral or side margins of the manway or removable tray section 2 and tray opening 3. End frame members or portions 16 (FIGS. 1, 2, 3,) are provided by downwardly offsetting the opposed transverse end margins of the plates 14, inwardly of their longitudinal margins 12, which are contiguous or abut the opposed ends of the manway and its closure or cover 5 and which are disposed between the plates 6 having the aforesaid lateral frame members or portions 15 formed by the offset upper flanges or shoulders 9 of their integral beams 8. These frame members are coplanar and recessed relative to the deck plates so as to support the closure or cover 5 flush or coplanar with the deck or floor plates 6 and 14 to form a continuation thereof. The transverse end frame members 16 function as the downwardly offset generally horizontal upper flanges or shoulders of integral auxiliary or secondary tray supports or beams 17 having generally parallel lower flanges 18 and upright connecting webs 19 similar to the lower flanges 11 and webs 10 of beams 8.

The closure or cover is foldable to facilitate installation and removal thereof and is composed of a pair of flat oblong, preferably quadrangular, closure members or panels 20 having spaced perforations 21, similar to plate perforations 7. These closure panels are disposed in side-by-side relationship and have a hinged connection 22 between the adjacent inner longitudinal margins thereof. Although subject to variation, preferably, the closure panels 20 are of equal dimension or size as illustrated so as to be generally one-half the area or size of the removable tray section or manway 2 whereby the outer lateral or side and transverse end margins of said panels are adapted to rest upon the frame members 15, 16, respectively, of said manway or tray section. As will be apparent hereinafter, the closure panels may be generally identical for economy and simplicity of manufacture.

For slidably confining the outer longitudinal margin of each closure panel, an overlying clip or keeper 23 is welded or otherwise secured to the upper surface or top side of each deck plate 6 at its lateral or longitudinal marginal portion adjacent and in spaced relation to one of the lateral or side frame members 15 formed by portions of the downwardly offset upper flanges or shoulders 9 of their integral beams 8. As shown at 24 in FIGS. 1, 2, 6, 7, the inner longitudinal edge portion or lateral margin of each clip or keeper 23 is bent or inclined upwardly at an obtuse angle to form an upset lip for guiding the insertion of the outer lateral or side margin of each closure panel 20 into the shallow elongate recess formed by said keeper. Obviously, each recess permits inclination of each closure panel upon engagement and disengagement of its outer lateral margin therewith. Preferably, the keepers are in the form of elongate narrow plates or strips and are generally coextensive with or of slightly greater length than the adjacent outer lateral margins of the removable tray section or manway 2 as well as its closure panels 20 so as to more or less seal the joints at said margins. Although not illustrated, it is readily apparent that suitable packing may be provided for sealing off between the margins of the frame 4 and cover 5 in the same manner as between the margins of adjacent deck plates when desirable or necessary as shown by the expired patent to Glitsch, No. 2,611,457. Also a multiplicity of spaced relatively small keepers or clips 25 (FIG. 10) may be substituted for each of the one-piece coextensive keepers. Each clip 25 has an upturned lip 26, similar to the marginal lips 24 of keepers 23, and may be rectangular or of any other suitable shape.

Hinged connection 22 between the adjacent inner longitudinal margins of the closure panels of the cover 5 may be composed of a plurality of separate hinged connectors suitably mounted thereon (FIGS. 2, 3, 6, 7) or could be of one-piece coextensive construction as shown at 66 (FIG. 10) in somewhat the same manner as the one-piece continuous keeper 23. An upright generally coextensive reinforcing flange or member 27 (FIGS. 2, 3, 6, 7) may depend from the inner longitudinal margin of one or the first of the closure panels 20 and have a similar generally horizontal flange or member 28 extending inwardly from its bottom or lower margin in spaced generally parallel underlying relation to said panel inner margin. The upright depending flange or member 27 is adapted to abut or engage a similar upright reinforcing flange 29, of less depth or transverse width, extending downwardly from the inner longitudinal margin of the other or second of the closure panels when the cover is unfolded and/or mounted on the recessed frame 4 in overlying relation to the tray opening 3.

As shown in FIGS. 2, 3, all of these flanges terminate short of the end margins of the closure panels 20 so as to be spaced from the end frame members 16 as well as the ends of said panels adapted to rest thereupon. Plates or members 30, 31 of each of the spaced hinged connectors 22 (FIGS. 6, 7) are offset relatively to each other when mounted, with hinge plate 30 being fastened to the outer surface of upright panel flange 27 in underlying relation to upright panel flange 29 and with hinge plate 31 being fastened to the inner surface of said latter flange 29. If desirable or necessary, suitable packing may be inserted between the aforesaid upright flanges of the closure panels so as to seal off therebetween.

For detachably securing the closure or cover 5 of the removable tray section or manway 2 to recessed frame 4, a suitable fastener 32 (FIGS. 1, 2, 3, 6, 7) is mounted on each end portion of one of the the closure panels 20 or on opposite end portions of both panels (FIGS. 14, 17, 18, 19) in adjacent spaced relation to hinged connection 22, thereby frictionally clamping the end portions of said panels to the end frame members 16. It is noted that a single pair of these fasteners are sufficient to prevent displacement of the cover 5 due to the hinged connection of its closure panels as well as the keepers 23, 25 and that it is preferable to mount said single pair of fasteners on opposite ends of said panels whereby the latter may be generally identical. Each fastener 32 may include an upright rotatably mounted rod 33 projecting through the closure panel and its underlying flange 28 (FIGS. 6, 7) in spaced relation to its upright depending reinforcing flange 27 as well as to its end margin which rests on one of the end frame members 16. Suitable arms or handles 34 extend laterally from the upper and lower ends of rotatable rod 33 above the panel 20 and below its underlying flange (FIG. 3) to permit actuation of the fastener from above and below the tray 1. A circular flat clamp member or washer 35 is secured to the upper portion of the actuating rod for resting on the closure panel so as to support the fastener and coact with a flat clamp arm or member 36 fastened to the lower portion of said rod in rotatable engagement with the underside of underlying lower flange 28 of said panel. Since upright depending flange 27 of panel 20 and upright web 19 of each auxiliary transverse beam 17 are of the same width, lower panel flange 28 and lower flange 18 of said beam are coplanar whereby clamp arm 36 of fastener 32 is adapted to frictionally engage the underside of said lower beam flange when the rod 33 is turned by either of its handles 34 so as to so dispose said clamp arm.

As shown by numeral 37 in FIG. 3, the upper surface of the corner of the flat clamp arm which initially engages the underside of the beam flange 18 may be bevelled or chamferred to facilitate the initial engagement of said arm surface with said flange underside. Also, each clamp arm 36 may be angular in plan so as to have an outer transversely oblong portion 38 of enlarged area so as to amplify the surficial contact of said arm with the lower flange of each auxiliary transverse beam 17. If desired, a suitable upright stop element or lug 39 (FIGS. 3, 6, 7) may upstand from the inner margin of the outer oblong portion 38 of each generally flat clamp arm for striking the inner longitudinal margin of the lower flange 28 of the aforesaid first of the closure panels 20 when said arm is completely disengaged from lower flange 18 of each auxiliary beam. Primarily, the outer flat surface of the stop lug 39 is adapted to abut against upright web 19 of the beam when arm 36 is in full frictional clamping engagement with the underside of the lower flange of said beam. Obviously, the frictional engagement of the clamp arms of the fasteners with the undersides of the lower flanges of the auxiliary transverse beams 17 in coaction with keepers 23, 25 detachably connect the cover 5 to frame 4 in overlying relation to the tray opening 3.

As stated hereinbefore, the structure of the fasteners for frictionally clamping the end portions of the closure panels 20 in overlying engagement with end frame members 16 (offset upper flanges of beams 17 at ends of deck plates 14) may vary. A similar modified fastener 42 is shown in FIG. 4 as having similar lateral arms or handles 44 at its ends and with its clamp member 46 being in the form of an angular bar or plate (U.S. Pat. No. 2,611,457) secured to the medial portion of its actuating rod 43 in underlying close proximity to each end margin of one or the first of the closure panels. An upright transverse flange 48 upstands from the inner end of clamp plate 46 so as to bear against the underside of the closure panel 20 and coacts with overlying washer 45 on said rod to maintain said clamp plate in spaced parallel relation to said panel. The upright web 19 of each auxiliary or secondary transverse beam 17 at the inner end of each deck panel 14 has an elongate opening or slot 41 extending longitudinally thereof in closely spaced parallel relation to the offset upper flange (end frame member 16) of said beam, and the outer end of the clamp plate of each fastener 42 is adapted to engage in the slot for frictionally clamping each end of the aforesaid first closure panel in overlying engagement with each end frame member 16. It is noted that the length of slot 19 must be sufficient to accommodate swinging or pivotal movement of the clamp plate 46 upon rotation of actuating rod 43.

Another similar modified fastener 52 is shown in FIG. 5 and has an angular clamp member or plate 56, similar to clamp member 46 of fastener 42, secured in the same manner to the medial portion of its actuating rod 53 which has lateral arms or handles 54 at its ends. Clamp member 56 has a similar upstanding flange 58 on its inner end for bearing against the underside of the closure panel and coacting with overlying washer 55 on rod 53 to maintain said clamp plate in the aforesaid parallel relationship. As shown by numeral 60, each of the end frame members or end portions 16 of recessed frame 4 may consist of only a single downwardly offset parallel flange at the inner transverse end of each deck plate 64 which may be otherwise identical to deck plates 14. It is readily apparent that the clamp member of each fastener 52 is adapted to frictionally engage the underside of each recessed end frame member or offset marginal plate flange 60 and maintain each end margin of closure panel 20 in frictional engagement with the top side of said end frame member.

As stated hereinbefore, the hinged connection between the adjacent inner longitudinal margins of the closure plates of cover 5 may be modified. In FIG. 8, one or the first of closure panels 70 may be similar to the first or one of the closure panels 20 so as to have an upright generally coextensive reinforcing flange depending from its inner margin. Second or other closure panel 71 may have an unflanged coplanar inner longitudinal margin or edge portion 73 and one or more hinge plates 75 of hinged connection 72 fastened to its underside. One or more coacting hinge plates 74 underlie edge portion 73 of closure panel 71 and are attached to the upper portion of the adjacent or outer surface of upright flange of closure panel 70.

A further modified hinged connection 82 is shown in FIG. 9 for a pair of closure panels 80 and 81. Inner longitudinal margin or edge portion 83 of panel 81 is coplanar and flat, similar to the margin 73 of panel 71, but projects inwardly of hinged connection 82 in overlapping relation to panel 80. A downwardly offset coextensive flange or shoulder 86 is provided at the inner longitudinal margin of closure panel 80 for overlying engagement by the aforesaid closure panel margin 83. A similar upright reinforcing flange may depend from the outer longitudinal margin of downwardly offset flange 86. Hinge plate 84 of hinged connection 82 is fastened to the upper portion of the outer surface of upright flange, while coacting hinge plate 85 is attached to the underside of closure panel 81 in spaced relation to its inner margin or edge portion 83.

As set forth hereinbefore, the perimetrical contours of the quick opening manways or removable tray sections are subject to variation. FIG. 11 illustrates a similar tray section or manway 90 in the form of a rhomboid or oblique angled parallelogram. If desired, this manway may be equilateral so as to have a rhombus shaped perimeter. As shown at 95 in FIG. 12, the manway or removable tray section may be of trapezoidal perimetrical configuration. The respective tray sections or manways 90, 95 have complementary covers 91, 96 comprising pairs of oblong closure panels 92, 97, respectively disposed side-by-side and having respective hinged connections 93, 98 between their adjacent inner longitudinal margins so as to be foldable for speedy installation and removal in the same manner as described hereinafter as well as hereinbefore. As disclosed hereinafter, each tray may have a plurality of removable tray sections or manways.

Due to the hinged connection between the adjacent inner longitudinal margins or edge portions of the closure panels, it is readily apparent that the provision of a reinforcing flange on only one of said margins reinforces the other margin whereby the removable tray sections or manways may have maximum optimum dimensions without sacrificing strength. In addition, the underlying reinforcing flange facilitates the underside mounting of the hinged connection and thereby permits the top side or upper surface of the closure panels to be uncluttered and conformed to the top side of the tray. Also, when the manway or removable tray section is oblong, the longitudinal foldability of its cover permits said manway or tray section to be of maximum width. Manifestly, the coaction of the hinged connection of the closure panels and the confinement of the outer longitudinal margins of said closure panels by the clips or keepers make it unnecessary to employ more than one of the end fasteners 32, 42, 52 at each transverse end of one or either of said panels, whereby said panels may be generally identical and each have a single fastener at only one end in opposed relation to the end fastener of the other panels.

Each of the removable tray section or manway covers is installed by resting the end portions of the outer lateral or longitudinal margins of the closure panels upon the transverse end frame members 16, 60 and spreading said panels so as to unfold said cover. These margins of the closure panels are adapted to be slid outwardly along the transverse end frame members into overlying engagement with the lateral or side frame members 15 for confinement by the keepers 23, 25, and then the end fasteners are rotated into engagment beneath and/or with said transverse end frame members to secure the cover against displacement. It is again noted that this installation may be performed from above or below the fluid contact tray in a fraction of the time required by conventional manways since the manipulation of only two fasteners is involved.

To remove the aforesaid cover, it is only necessary to rotate these two end fasteners out of engagement with the transverse frame members. Then the closure panels are elevated or lifted at their inner longitudinal margins so as to pivot said panels inwardly about their hinged connection toward folded relationship. The end portions of the outer lateral or longitudinal margins of the panels slide laterally inward along the transverse end frame members, upon continued pivotal movement, until said panel margins are disengaged from the lateral or side frame members and keepers as shown in FIG. 7. If desired, the cover may be placed to one side so as to rest upon the fluid contact tray as shown in FIG. 10 and folding thereof may or may not be completed. In any event, the opening of the manway or removable tray section may be completed in a fraction of the time required by conventional manways by a single workman from above or below the tray.

As will be apparent, other variations of the hinged connection 22 between the closure panels 20 are within the scope of the invention and a hinged connection (similar to hinge 66 of FIG. 10) may be substituted for one of the continuous keepers 23 or set of clips 25 for connecting the outer margin of one of said closures to the adjacent edge portion of the tray or deck plate 6 or lateral frame member 15. In addition, it should and will be obvious that frictional fasteners 32, 42, 52 need not be mounted on the same closure panel and that it is preferable for each panel to carry one of the fasteners so long as said fasteners are at opposite ends of cover 5 for engagement with opposed transverse end frame members 16, 60.

DESCRIPTION OF A PREFERRED EMBODIMENT

As shown in FIG. 13, one or more trays 99 of a fluid or vapor-liquid contact vessel or fractionating tower (not shown) may have two or more removable tray sections or manways 100, such as when a tray requires two or more downcomers due to its relative large area or diameter and/or its flow requirements. Tray 99 is illustrated as having a pair of inlets areas 101 at diametrically-opposed segments thereof for receiving flow from the pair of overlying downcomers of the tray (not shown) thereabove. A dual center downcomer 102 of relatively large area is shown extending diametrically across the tray for directing flow to its underlying tray (not shown). The tray may be of any suitable type and comprises a multiplicity of deck or floor plates or sections 106 supported by beams 108 similar to beams 8 and underlying the adjacent edge portions or margins of the deck plates. Openings 107 (shown only in FIG. 13) may be formed in the deck plates 106 for the mounting of bubble caps or valves, neither of which are illustrated. Spaced frictional clamps or fasteners 113, similar to fasteners 13, are mounted on the beams so as to be disposed between and have margins thereof in overlying confining engagement with the adjacent margins of the deck plates. As described hereinbefore and shown in FIGS. 1, 2, 10, these beams may be integral with the deck plates.

The removable tray sections or manways 100 are similar to the removable tray section or manway 2 and each comprises a similar polygonal, preferably quadrangular, opening 103 in the tray 99 defined by a similar perimetrical recessed frame 104 (FIG. 13). A complementary closure or cover 105 overlies and is adapted to be detachably fastened to each recessed frame in coplanar relation to deck plates 106. As shown in FIG. 13 only, each closure or cover may have openings 121 therein similar to the openings 107 of the deck plates 106. Lateral or side frame members or portions 115 of each recessed frame 104 (similar to frame members 15) are formed by the contiguous supporting beams 108 at or integral with the longitudinal margins of the adjacent deck plates. A portion of one of the transverse end frame members 116 of frame 104 is shown in FIGS. 13, 20, 21 and each of said frame members includes an upper flat generally horizontal flange or shoulder 117 integral with and offset downwardly from the adjacent end margin of each of deck plates 114 disposed at the transverse ends of each manway or removable tray section between deck plates 106. A similar lower reinforcing flange 118 is connected by an upright web 119 to the flange or shoulder 117 in underlying generally parallel spaced relationship.

Each of the closures or covers 105 is composed of a pair of flat oblong closure members or panels 120 similar to panels 20 of cover 5 and having their inner lateral or longitudinal margins foldably connected by a similar hinge connection 122. Similar clips or keepers 123 (FIG. 13) which may have similar upturned lips (not shown) coextensive with the inner margins thereof, are secured to the top side of the adjacent lateral or longitudinal margins of deck plates 102 for slidably confining the outer lateral or longitudinal margins of closure panels 120. Preferably, these panels are identical for simplicity and economy of manufacture and each panel has an elongate reinforcing flange 125, 126 depending perpendicularly from its inner margin for abutting each other. As best shown in FIGS. 14, 17, 18, 19, each of these reinforcing flanges terminates short of the ends of its closure panel, and a plurality or set of upright flat angular hinge elemets or plates 127, 128, such as three as shown, depends from the lower longitudinal margins of the flanges 125, 126, respectively, in laterally outward offset parallel relationship. The angular hinge plates 127, 128 of each set are elongated longitudinally of their respective flanges and are spaced apart a distance at least not less than the length of one of said hinge plates. Each set of offset hinge plates is closer to one end of its flange than the other whereby the hinge plates 127 are staggered or offset lengthwise of said hinge plates 128 and are adapted to overlap transversely when the closure panels 120 are reversed end-to-end relative to each other, as shown in the drawings, and said flanges are in abutting relationship.

Figure 14:
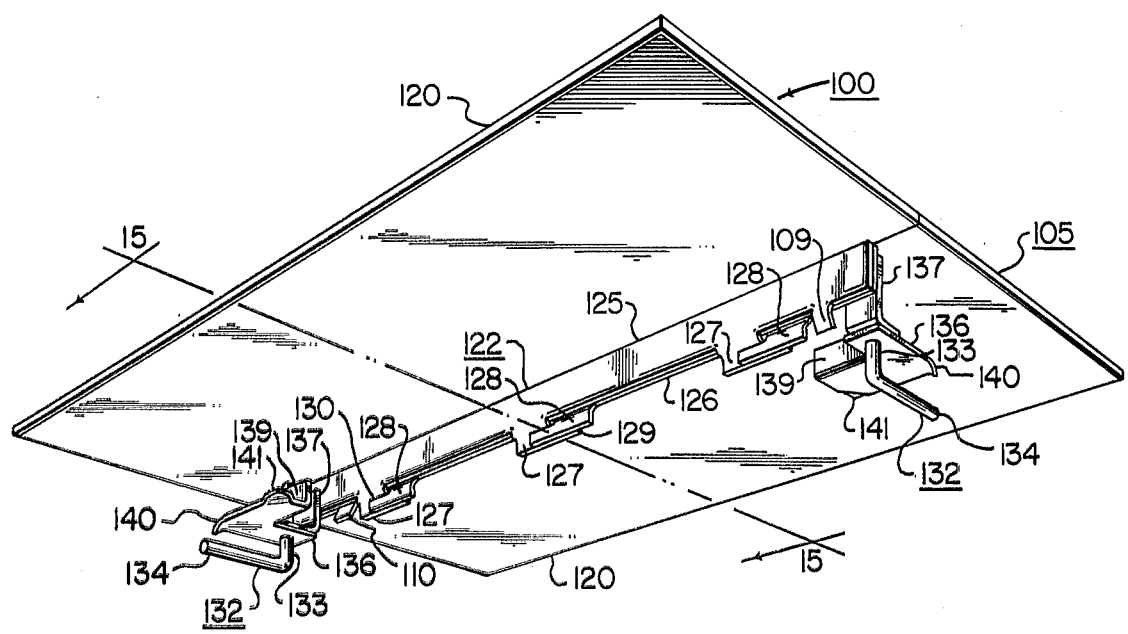
FIG. 14 is an enlarged underside perspective view of one of the removable tray sections of FIG. 13 and illustrating a preferred embodiment of the invention.

An extension or finger 129, 130 projects longitudinally from one end of each hinge plate 127, 128 in transversely spaced relation to its flange 125, 126 so as to provide a longitudinal slot therebetween. The extensions of each set of angular hinge plates project in the same direction and opposite to the direction of the extensions of the other set of hinge plates. The extensions 129, 130 are directed toward the end of the flange which has its set of hinge plates closer thereto, whereby said extensions 129 overlie portions of hinge plates 127 and extensions 130 overlie portions of hinge plates 128 when said hinge plates are fully engaged as shown in FIGS. 14, 19, 20.

For preventing longitudinal displacement and separation of the hingedly connected closure panels 120, a coplanar flat latch plate or lug 109, 110 projects downwardly from the lower margin of each flange 125, 126, respectively, between one of its ends and its adjacent hinge plate 127, 128, of the set closer thereto, and is adapted to be bent laterally into overlapping relation to the other flange 126, 125, respectively. The latch lugs are disposed at opposite ends of the flanges and each lug slidably engages the contiguous side of the adjacent endmost hinge plate of the other flange prior to slidable coengagement of the extensions of the hinge plates (FIG. 18) upon initial abutment of said flanges so as to function as guides for each coengagement. As shown in FIGS. 14, 19, 20, 21, each lug 109, 110 is adapted to abut the adjacent endmost hinge plate 128, 127, respectively, of flange 126, 125 when said lug is bent into the aforesaid overlapping relationship.

Figure 15:
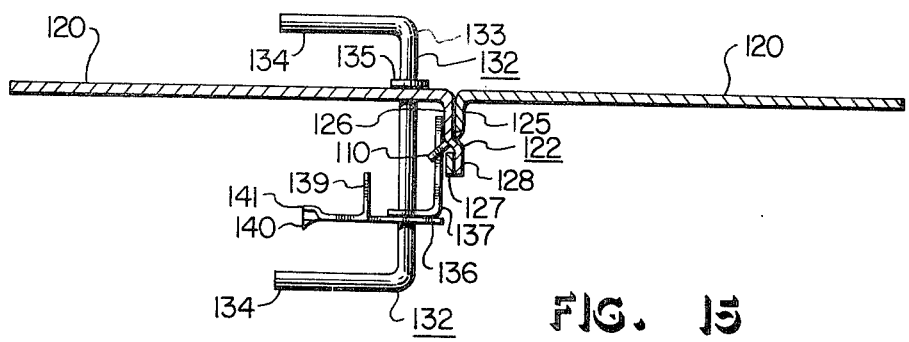
FIG. 15 is an enlarged transverse vertical sectional view, taken on the line 15—15 of FIG. 14, showing the hinged connection between the inner margins of the closure panels of the removable tray section in closed position.
Figure 16:
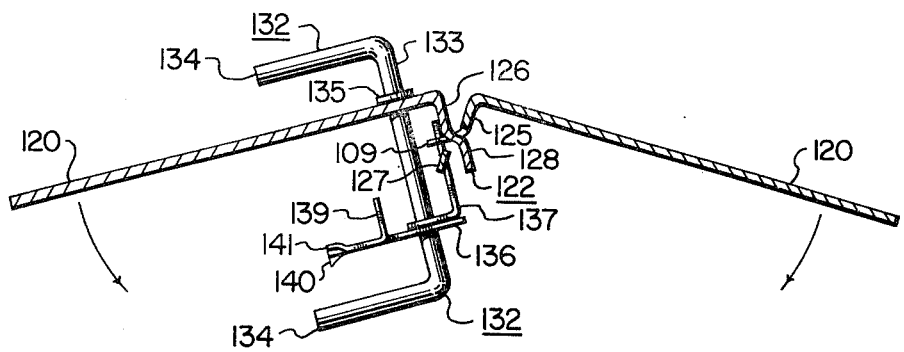
FIG. 16 is a view similar to FIG. 15 and shows said closure panels partially folded.
Figure 17:
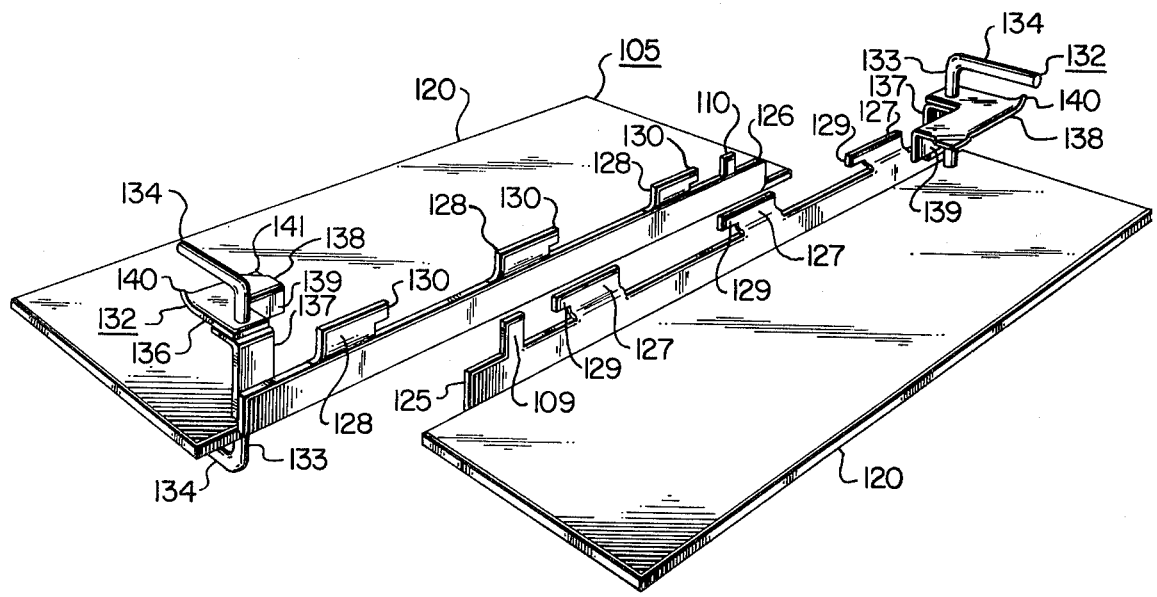
FIG. 17 is an inverted perspective view of said closure panels preparatory to the mating engagement of the hinge elements.

A frictional fastener 132, similar to fasteners 32, is mounted on one end portion of each closure panel 20 opposite each other (FIGS. 14, 17, 18, 19) or on both end portions of either or only one of the panels (FIGS. 1, 2, 10) in closely spaced relation to hinged connection 122 to detachably connect the closure or cover 105 of the removable tray section or manway 100 to recessed frame 104 by frictionally clamping one end portion of each panel to the end frame members 116. Each fastener 132 includes a similar operating rod 133 rotatably mounted (FIGS. 20, 21) in spaced relation to the upright hinge flange 125, 126 of its respective closure panel and the end margin of said panel which rests on one of the end frame members. Each rod 133 has similar lateral arms or handles 134 at its ends, upper clamp member or washer 135 resting on the closure panel (FIGS. 15, 16) and lower clamp arm or member 136. An angular bracket 137 depends from one end of each hinge flange for rotatably supporting the lower end portion of each operating rod and its lower clamp arm 136, which is adapted to frictionally engage the underside of lower flange 118 of the adjacent end frame member 116 (FIG. 21) when said rod is turned by either of its handles 134 so as to swing said clamp arm into such position. This clamp arm is shown as being angular and having an enlarged outer transversely oblong portion 138 so as to increase its surficial contact with the aforesaid flange 118. An upright stop element or flange 139, similar to stop element 39, upstands from the inner margin of outer oblong portion 138 of clamp arm 136 so as to bear against upright web 119 of adjacent end frame member 116 upon complete frictional engagement of said clamp arm with the aforesaid lower flange of said frame member.

When each fastener 132 is in its opened or unlatched position, its angular clamp arm extends inwardly so as to underlie the closure panel upon which said fastener is mounted (FIG. 20) and stop flange 139 of said arm is adapted to strike flange 125, 126 of said panel to limit opening movement of said fastener and indicate the position of said arm which has its external corner 140 in close proximity to end frame member 116. Upon rotation of the fastener into its latching position, external corner 140 of clamp arm 136 is adapted to initially engage the end frame member and is downturned so as to reduce resistance to continued rotation and facilitate movement of said arm into locking position (FIG. 21) beneath lower flange 118 of said end frame member. Corner 141 of the angular clamp arm between the stop flange and external corner of said arm is upturned or offset upwardly and is adapted to ride against the underside of the aforesaid lower flange and snap into engagement with the outer longitudinal margin of said flange opposite its connection with web 119 of end frame member 116. The installation and removal of the preferred embodiment 100 is generally identical to that of removable tray section or manway 2 described hereinbefore.

As pointed out hereinbefore, the structures of the frictional fasteners vary in accordance with the type of end or transverse frame members. In particular, the fasteners 132 may be utilized in conjunction with the closure or cover 5 of FIGS. 1, 2, 3 due to the similarity of frame members 16 and 116. The locations of these fasteners are generally interchangeable as are the hinged connections and the keepers. Another variation is shown in FIG. 22 wherein a portion of a tray 199 is illustrated as having an elongate similar quick opening section 200, similar deck plates 206, similar supporting beams 208 and similar clamps or fasteners 213. Opposed portions of an adjacent pair of these beams function as longitudinal frame members or portions 215 of frame 204 which defines complementary tray opening 203. End or transverse frame members or portions, one of which is shown at 216, of the frame are provided by spaced auxiliary or secondary beams extending transversely between the main or primary beams or lateral frame members 215. Each end frame member 216 is similar to frame members 16, 116 and may be integral with and form the inner end margin of one of the adjacent deck plates 214.

Quick opening tray section 200 may be considered as equivalent to cover 5, 105 and is composed of a pair of closure members or cover panels 220, similar to panels 20, 120, having their contiguous inner longitudinal margins hingedly connected in a similar manner. A similar keeper or clip 223 is suitably secured to longitudinal edge portion 212 of one of the adjacent deck plates 206 for slidably confining the outer longitudinal margin of one of the cover panels 220 in engagement with the underlying longitudinal frame member 215. The outer longitudinal margin of the other or opposite cover panel may be hingedly connected, similarly to continuous hinge 66, as shown at 222 in FIG. 13, to the longitudinal edge portion 112 of the deck plate adjacent the other longitudinal frame member whereby tray section 200 is removable only in the sense that its cover panels are removable from engagement with frame 104 upon unlatching and folding of said panels. It is noted, however, that continuous hinge 222, as well as hinge 66, may have a readily removable pintle (not shown) to permit complete removal of tray section 200 in the same manner as cover 5, 105. Of course, this tray section may be generally identical to either of these covers so as to have both of its outer longitudinal margins slidably confined by keepers 23, 123 as well as have hinge connection 22, 122 between the adjacent inner longitudinal margins of its panels 220. Also, cover 5, 105 may have the outer lateral margin of one of its panel 20, 120 hingedly connected to adjacent deck plate 6, 106; and any one of the manways and tray sections may have the adjacent inner margins of its cover panels extending transversely (FIG. 12) instead of longitudinally thereof.

Due to the relatively large number of trays in fluid contact vessels and fractionating towers, lost production time and the cost of highly skilled labor, the saving of time is most important. Refineries and chemical plants require regular maintenance shutdowns for inspection, repair, replacement and/or other modifications at least once a year and, in some instances, twice a year. Another important factor resides in the structure of present day fractionating columns or towers and other fluid contact vessels wherein a minimum number of manholes is provided in the walls thereof for economy, and the trays and other interior elements of said vessels are constructed in parts or sections capable of being passed through manholes of minimum dimensions. It has been found that the quick opening tray section or manway of this invention can be removed and reinstalled in approximately (25%) to (35%) percent of the time required by conventional manways, whereby (75%) to (65%) percent saving of man hours results. As set forth hereinbefore, one or more deck plates other than the manways may be removably mounted in accordance with the invention.

The foregoing description of the invention is explanatory thereof and various changes in the size, shape and materials, as well as in the details of the illustrated construction may be made, within the scope of the appended claims, without departing from the spirit of the invention.

I claim:

1. In a tray for a fluid contact vessel, a quick opening removable tray section including an open polygonal frame in the tray having lateral and transverse members defining the perimeter of an opening in said tray, a cover complementary to the frame and composed of a pair of polygonal panels having adjacent inner lateral margins hingedly connected to each other so as to permit folding of the cover, the panels of said cover having perimetrical outer lateral side and transverse end margins overlying and resting on the lateral and transverse members of said frame, opposed means secured to the edge portions of said tray adjacent said lateral members of said frame for connecting the outer lateral side margins of said cover panels to said tray, at least one of the opposed connecting means being immobile and overlying at least one of said lateral frame members in spaced relationship for slidably confining at least one of said outer lateral side margins of said panels, and frictional fastening means at the perimetrical outer transverse side margin of at least one of said cover panels for detachably connecting at least one of said transverse margins of said panels to at least one of the underlying transverse members of said frame.

2. A quick opening removable tray section as defined in claim 1 wherein both of the opposed connecting means secured to the edge portions of the tray adjacent the said lateral frame members are immobile and overlie said members in spaced relationship for slidably confining both of the outer lateral side margins of the said cover panels and project inwardly of said tray edge portions and have opposed inner margins spaced from each other a distance less than the transverse dimension of the unfolded cover between said outer lateral side panel margins whereby said cover must be at least partially folded to permit movement of said outer lateral side panel margins into and out of slidable confinement by said connecting means.

3. A quick opening removable tray section as defined in claim 2 wherein the inner margins of both of the aforesaid opposed immobile connecting means are upturned for guiding the outer lateral side margins of the said panels of the cover into and out of slidable confinement by said means.

4. A quick opening removable tray section as defined in claim 1 wherein at least one of the opposed connecting means comprises an elongate narrow member extending longitudinally of and generally coextensive with at least one of the tray edge portions adjacent the said lateral frame members.

5. A quick opening removable tray section as defined in claim 1 wherein at least one of the opposed connecting means comprises a multiplicity of spaced clips secured to at least one of the tray edge portions adjacent the said lateral frame members.

6. A quick opening removable tray section as defined in claim 1 wherein the frictional fastening means comprises a pair of fasteners disposed at the opposite outer transverse end margins of the said cover panels whereby each of the said transverse frame members have one of the fasteners detachably connected thereto.

7. A quick opening removable tray section as defined in claim 6 wherein the frictional fastening means at the outer transverse end margins of the said cover panels are in relatively close proximity to the said adjacent hingedly connected inner lateral margins of said panels so as to more positively connect said transverse end panel margins to said transverse frame members.

8. A quick opening removable tray section as defined in claim 6 wherein
each of the said cover panels has one of the opposed fasteners attached thereto.

9. A quick opening removable tray section as defined in claim 1 wherein
the frictional fastening means at the outer transverse end margins of the said cover panels are in relatively close proximity to the said adjacent hingedly connected inner lateral margins of said panels so as to more positively connect said transverse end panel margins to said transverse frame members.

10. A quick opening removable tray section as defined in claim 1 wherein the frictional fastening means comprises
a pair of fasteners with one thereof at one of the outer transverse end margins of one of the aforesaid cover panels for detachable connection with one of the said transverse frame members,
the other fastener being at the opposite outer transverse end margin of the other cover panel for detachable connection to the other transverse frame member.

11. A quick opening removable tray section as defined in claim 10 wherein
the frictional fasteners at the outer transverse end margins of the said cover panels are in relatively close proximity to the said adjacent hingedly connected inner lateral margins of said panels so as to more positively connect said transverse end panel margins to said transverse frame members.

12. A quick opening removable tray section as defined in claim 1 wherein the frictional fastening means comprises
a pair of fasteners with one thereof at each outer transverse end margin of only one of the said cover panels for detachable connection with each of the said transverse frame members so as to secure both of said closure panels to the aforesaid frame.

13. A quick opening removable tray section as defined in claim 12 wherein
the frictional fasteners at the outer transverse end margins of said one of the said cover panels are in relatively close proximity to the said adjacent hingedly connected inner lateral margins of said panels so as to more positively connect said transverse end panel margins to said transverse frame members.

14. A quick opening removable tray section as defined in claim 1 wherein the hinge connection between the cover panels comprises
a set of spaced hinge elements depending from each of the adjacent inner lateral margins of said cover panels in longitudinally offset relation to the hinge elements of the other set to permit intermeshing of said sets and abutment of the transverse surfaces of said adjacent inner lateral cover panel margins,
certain of said hinge elements having at least one of their end portions projecting longitudinally of and in transversely spaced relation to said inner margin of their respective cover panel so as to overlap contiguous portions of adjacent hinge elements of the other cover panel,
said hinge elements having at least their projecting end portions offset laterally outward of their respective cover panel to permit the overlapping of contiguous portions of said hinge elements, and
means for limiting relative longitudinal movement of said cover panels and thereby prevent disconnection of said sets of hinge elements.

15. A quick opening removable tray section as defined in claim 14 wherein the hinged connection between the cover panels comprises
an upright flange depending from each of the lateral inner margins of said cover panels and having one of the depending sets of hinge elements integral with its lower margin.

16. A quick opening removable tray section as defined in claim 15 wherein
the cover panels are identical and have identical flanges and sets of hinge elements,
each set of hinge elements being closer to one end of its respective cover panel than the other whereby the hinge elements of each set are offset longitudinally of the hinge elements of the other set and intermesh when one of said panels is reversed end-to-end relative to the other panel.

17. A quick opening removable tray section as defined in claim 16 wherein
the hinge elements are offset in their entireties laterally outward relative to their respective flanges.

18. A quick opening manway as defined in claim 17 wherein
each hinge element of at least one of the sets has a longitudinally projecting end portion.

19. A quick opening removable tray section as defined in claim 15 wherein
the hinge elements are offset in their entireties laterally outward relative to their respective flanges.

20. A quick opening manway as defined in claim 15 wherein
each hinge element of at least one of the sets has a longitudinally projecting end portion.

21. A quick opening removable tray section as defined in claim 14 wherein
the cover panels are identical and have identical flanges and sets of hinge elements,
each set of hinge elements being closer to one end of its respective cover panel than the other whereby the hinge elements of each set are offset longitudinally of the hinge elements of the other set and intermesh when one of said panels is reversed end-to-end relative to the other panel.

22. A quick opening removable tray section as defined in claim 14 wherein
the hinge elements are offset in their entireties laterally outward relative to their respective cover panels.

23. A quick opening manway as defined in claim 14 wherein
each hinge element of at least one of the sets has a longitudinally projecting end portion.

24. A quick opening removable tray section as defined in claim 14 wherein
both of the opposed connecting means secured to the edge portions of the tray adjacent the said lateral frame members are immobile and overlie said members in spaced relationship for slidably confining both of the outer lateral side margins of the said cover panels and project inwardly of said tray edge portions and have opposed inner margins spaced from each other a distance less than the transverse dimension of the unfolded cover between said outer lateral side panel margins whereby said cover must be at least partially folded to permit movement of said outer lateral side panel margins into and out of slidable confinement by said connecting means.

25. A quick opening removable tray section as defined in claim 14 wherein the frictional fastening means comprises a pair of fasteners disposed at the opposite outer transverse end margins of the said cover panels whereby each of the said transverse frame members have one of the fasteners detachably connected thereto.

26. A quick opening removable tray section as defined in claim 25 wherein the frictional fasteners at the outer transverse end margins of the said cover panels are in relatively close proximity to the said adjacent inner lateral margins of said panels so as to more positively connect said transverse end panel margins to said transverse frame members.

27. A quick opening removable tray section as defined in claim 25 wherein each of the said cover panels have one of the opposed fasteners attached thereto.

28. A quick opening removable tray section as defined in claim 1 wherein the other one of the aforesaid connecting means hingedly connects the outer lateral side margin of the other one of the cover panels to the tray.

29. A quick opening removable tray section as defined in claim 1 wherein the hinged connection between the cover panels comprises an upright flange depending from the inner lateral margin of at least one of said cover panels.

30. A quick opening removable tray section as defined in claim 1 wherein the frictional fastening means comprises a pair of clamp type fasteners one at each end of the cover and having an upright operating element rotatably mounted in one of the cover panels adjacent its transverse end margin with the ends of the element projecting on opposite sides thereof, a washer surrounding and secured to the medial portion of each operating element for engaging the upper surface of said cover panel, a clamp member mounted on and extending laterally of said operating element in spaced underlying relation to the washer and having a generally flat top side, each of the transverse frame members having an underside complementary to and adapted to be engaged by the topside of the clamp member upon rotation of said operating element, the underside of each transverse frame member being of relatively narrow width so as to have relatively close longitudinal margins, said clamp member topside having an upset portion adapted to ride past the relatively adjacent longitudinal margin of said transverse frame member underside and then thereover into engagement with the longitudinal margin of said underside relatively remote from said transverse end margin of said cover panel so as to latch said fastener in locked position, and handle means projecting laterally from each end portion of each upright operating element to permit manual actuation thereof from either side of said cover.

31. A quick opening removable tray section as defined in claim 1 wherein each of the transverse frame members has an underside widely spaced from its topside and the frictional fastening means comprises a pair of clamp type fasteners one at each end of the cover and having an upright operating element rotatably mounted in one of the cover panels adjacent its transverse end margin with the end portions of the element projecting on opposite sides of said cover panel, the underside of said transverse frame member and the lower portion of said upright operating element having coacting clamp means for detachably fastening said cover panel to said frame member, the clamp means including a first part thereof mounted on and projecting laterally from said lower portion of said operating element and a second part at said underside adapted to be engaged and disengaged by the first part upon rotation of said element, one of the coacting parts of said clamp means having an offset portion for latching said parts in engaged locking position.

32. A quick opening removable tray section as defined in claim 31 comprising handle means projecting laterally from each end portion of each upright operating element to permit manual actuation thereof from either side of the cover.

33. In a tray for a fluid contact vessel, a quick opening removable tray section including an open quadrangular frame in the tray having opposed lateral and transverse members defining the perimeter of an opening in said tray, a cover complementary to the frame and composed of a pair of generally identical quadrangular panels having adjacent inner lateral margins, the generally identical panels of the cover having opposed perimetrical outer lateral side and transverse end margins overlying and resting on the lateral and transverse members of said frame, a set of hinge plates depending from each of the adjacent inner lateral margins of said cover panels for pivotally connecting said inner panel margins, each set of hinge plates being closer to one end of its respective cover panel than the other whereby the hinge plates of said sets are staggered lineally of each other and intermesh when one of said panels is turned end-to-end relative to the other panel, at least one of said sets of hinge plates having the same one of their end portions projecting parallel to and in transversely spaced relation to said inner lateral side margin of one of said cover panels so as to overlap contiguous portions of adjacent hinge plates of the other panel, certain of said hinge plates having at least portions thereof offset laterally outward to permit the overlapping of contiguous portions of said hinge plates, means for preventing disconnection of said sets of hinge plates, opposed means at the edge portions of said tray adjacent the lateral members of said frame for connecting the outer lateral side margins of said cover panels to said tray, at least one of the opposed connecting means overlying at least one of said lateral frame members in spaced relationship for slidably confining said outer side margin of at least one of said panels, and frictional fastening means at the opposed outer transverse end margins of said cover panels for detachably connecting said opposed transverse end margins of said panels to the underlying opposed transverse members of said frame.

34. A quick opening removable tray section as defined in claim 33 wherein both of the opposed connecting means overlie the lateral frame members in spaced relationship so as to slidably confine both of the outer lateral side margins of the cover panels, said connecting means projecting laterally inward of the adjacent edge portions of the tray and having opposed inner margins spaced from each other a distance less than the transverse dimension of the unfolded cover between said outer lateral side panel margins whereby said cover must be at least partially folded to permit movement of said side panel margins into and out of slidable confinement by said connecting means.

* * * * *

UNITED STATES PATENT AND TRADEMARK OFFICE
CERTIFICATE OF CORRECTION

PATENT NO. : 4,120,919
DATED : October 17, 1978
INVENTOR(S) : Robert W. McClain

It is certified that error appears in the above—identified patent and that said Letters Patent are hereby corrected as shown below:

Claim 18, line 1, read --removable tray section-- for "manway".

Claim 20, line 1, --removable tray section-- for "mayway".

Claim 21, line 4, delete "flanges and".

Claim 23, line 1, read --removable tray section -- for "mayway".

Signed and Sealed this

Sixth Day of July 1982

[SEAL]

Attest:

GERALD J. MOSSINGHOFF

Attesting Officer     Commissioner of Patents and Trademarks